United States Patent Office 2,720,632
Patented Oct. 11, 1955

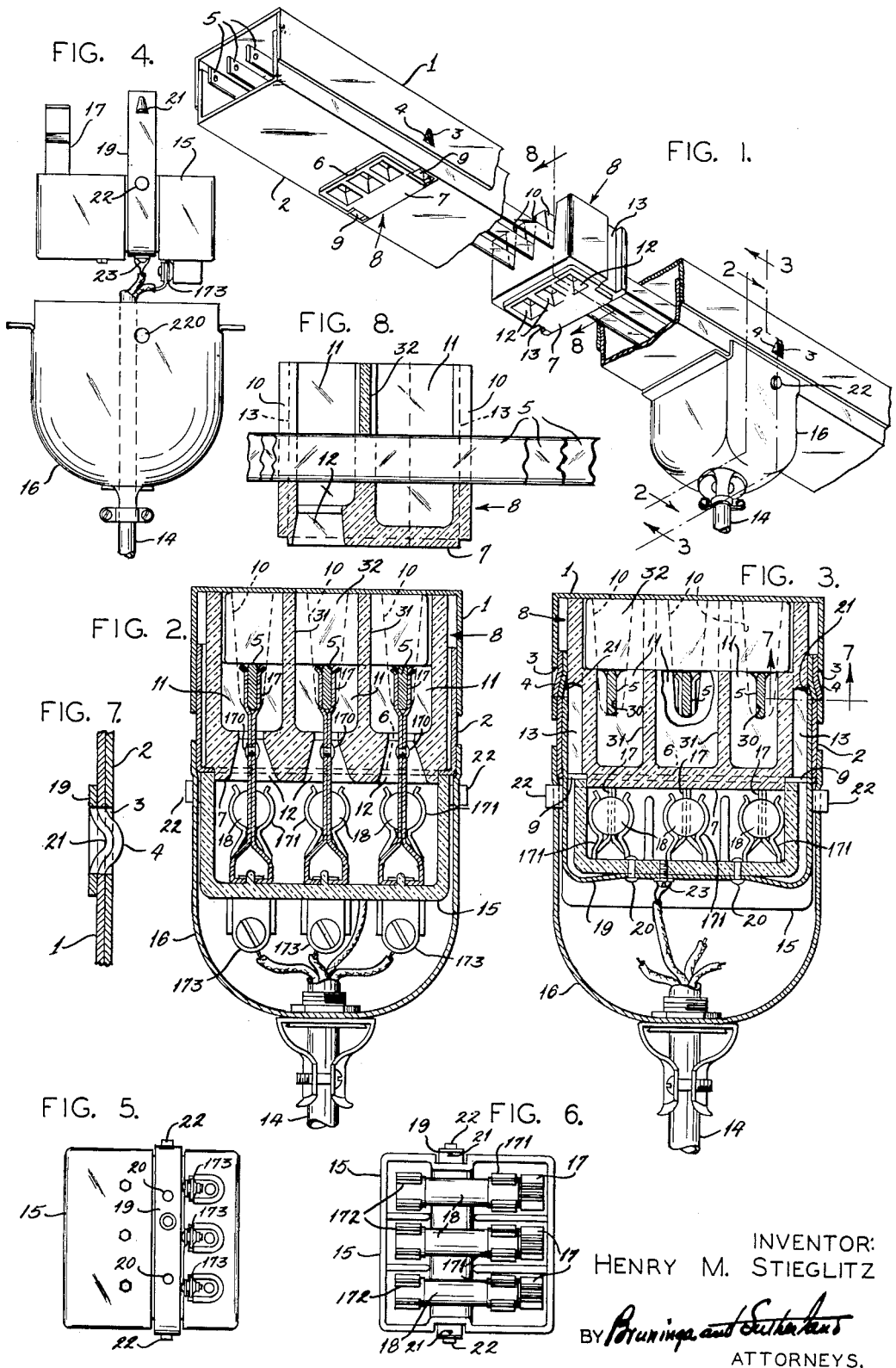

2,720,632

BUS DUCT AND BRANCH CIRCUIT CONNECTOR FOR POWER DISTRIBUTION SYSTEMS

Henry M. Stieglitz, St. Louis, Mo., assignor to Frank Adam Electric Company, St. Louis, Mo., a corporation of Missouri Application May 12, 1949, Serial No. 92,763

8 Claims. (Cl. 339—22)

This invention pertains to electric power distribution, and more particularly to power outlets of the plug-in type, as applied to industrial distribution systems.

Systems of distributing electrical power in industrial plants, wherein bus bars are encased in metallic ducts, are in widespread use and are commonly referred to as bus duct systems, or bus ducts. In such bus duct systems it is common to provide access doors or windows which, when opened, permit the attachment of a branch circuit. As heretofore provided, such branch circuit connections have been required to be made or unmade by skilled mechanics, utilizing tools. The connection of the branch circuits is therefore permanent or semi-permanent, and not releasable at will by merely "plugging in" the branch circuit connector to the bus duct. Safety considerations have made it difficult to provide a branch circuit connector which may be inserted or removed at will, because of the liability that an unskilled person might suffer electrical shock upon insertion or removal of the plug-in-device, and when the plug-in-device is removed, substantial portions of the bus bars within the bus ducts will be dangerously exposed.

One of the objects of this invention is to provide improved means for connecting branch circuits to power distribution systems run in bus ducts.

Another object is to provide such means of the plug-in type having improved safety features and simple construction.

Further objects will appear from the following description, in which will be set forth an illustrative embodiment of this invention. It is understood, however, that this invention is susceptible of various embodiments within the scope of the appended claims, without departing from the principles or spirit of the invention.

In accordance with this invention, generally stated, the individual lengths of bus duct in a bus duct system are formed of transversely telescoping channels, provided with complementary parts which interlock not only to connect the channels together, but to releasably anchor plug-in-devices which may be selectively applied at will. At intervals along one of the channels (generally the bottom) openings are provided for the exposure of insulation members, which serve not only to position the bus bars within the duct, but to receive the contact parts of detachable plug-in-devices. An important feature of the invention is the arrangement of the plug-in-device so that in the process of attachment, exposed conductive parts thereof are grounded to and through the bus duct before electrical connection with the bus bars can be made. The plug-in-device is arranged to carry its own fuses, so that access thereto is impossible except when detached from the bus duct.

A preferred embodiment of this invention is illustrated in the accompanying drawing, in which:

Figure 1 is a perspective view of a bus duct, plug-in-outlet and plug-in-device assembly embodying this invention, with parts broken away to show the interior relationships;

Figure 2 is a section on line 2—2 of Figure 1;

Figure 3 is a section on line 3—3 of Figure 1;

Figure 4 is a side view of the plug-in-device with the interior and exterior parts separated for making electrical connections;

Figure 5 is a bottom plan view of Figure 4;

Figure 6 is a top plan view of Figure 4;

Figure 7 is an enlarged detail section on line 7—7 of Figure 3; and

Figure 8 is a sectional view taken along line 8—8 of Figure 1.

In the embodiment illustrated in the drawing, the bus duct is formed of an upper channel section 1 and a lower channel section 2. The section 1 is provided at intervals therealong with perforations 3 of generally triangular shape, with the lower edge thereof substantially straight. The section 2 is formed at corresponding intervals therealong, with lugs 4 projecting outward from the side walls thereof. The lugs 4 are also triangular in shape, with the lower edge formed by a straight cut through the metal. When the two duct sections are assembled in transversely telescoped relation, as shown in Figure 1, the lugs 4 snap into the openings 3 to retain the sections in this relation. The connection between parts 1 and 2 is not only strong and secure, but readily releasable for access to the interior of the duct.

A plurality of bus bars 5 are arranged within the duct. The section 2 is formed at intervals therealong, with irregular openings 6 adapted to permit the reduced face portion 7 of an insulator block 8 to project therethrough. The openings 6 are positioned along the duct so as to align the lateral extensions 9 thereof with the several lugs 4, or some of them.

The insulator block 8 not only positions the bus bars within the duct, but provides a plug-in-outlet for the reception of a plug-in-device. The block 8 is dimensioned laterally to fit easily between the side walls of the section 2. Its face portion 7 is reduced in both its horizontal dimensions, as shown in Figure 1, so as to extend through the opening 6, but the body of the block will not pass through the opening 6. Hence the opening 6 positively locates block 8. Slots 10 are formed in the upper portions of both end walls of the block 8, to accommodate bus bars 5. These slots communicate with interior chambers 11, formed in the block, and separated from each other by insulating barriers 31, as shown in Figure 2. One of the bus bars 5 passes through each of these chambers 11. These chambers also communicate with vertical passages 12 extending through face 7 of the block, whereby the contacts of the plug-in-device may be inserted, as will be described later. The block 8 is further provided with vertical side grooves 13, which are positioned to register with the lateral extensions 9 of the opening 6 when the block is engaged in that opening.

The plug-in-device comprises a base 15 of molded insulation, which is enclosed on all but one side by a metallic shell 16. Mounted on the base 15 so as to project from the side thereof which is not enclosed within shell 16 are a plurality of prong contacts 17. The contact 17 may be formed of a strip of metal, bent to provide a central bight (at which mechanical connection is made within a hollow portion of base 15) and a two-ply leg, which terminates in a spring bifurcation, for pressure engagement with a bus bar. The respective plies of the leg may be suitably connected together near the bifurcation, as by rivets 170. The several contacts 17 are arranged for insertion through the respective openings 12 of block 8 to make contact, each with a different one of the respective bus bars 5, as shown in Figure 2.

Each of the prongs 17 may be integral with a pair of fuse clips 171. A companion pair of fuse clips 172 is secured within the hollow of base 15, opposite each pair of clips 171. The clips constituting pair 172 may be formed with a connection lug 173, which extends through an aperture in the base 15. Lead wires from a cable 14 may be connected with lugs 173. The arrangement of the fuse clips 171 and 172 is such that a fuse 18 may be inserted to bridge the opposite pairs of clips, and the fuse will be confined within the hollow of base 15.

Secured to the base 15, so as to be insulated from all of the aforesaid current-carrying parts thereon, is a U-shaped strap 19, preferably of resilient metal. This strap is secured to the base 15 in any suitable manner, as by rivets 20. The ends of this strap project substantially beyond the base 15, and are so positioned thereon that when they are inserted in the openings 9 and along grooves 13, the contacts 17 are guided into openings 12 of block 8. Each of the projecting ends of strap 19 has formed thereon a lug 21, similar in shape to the inside of the lug 4 on the duct section 2. Since the lug 4 is concavo-convex in its horizontal section, as shown in Figure 7, it may be engaged in the opening 3 on its convex side to secure the duct sections, while at the same time it may receive the lug 21 on its concave side, as shown in Figures 3 and 7, to latch the plug-in-device in assembled relation with the bus duct. The legs of the U-shaped strap 19 are flared slightly, so that they must be sprung inward to make them enter the openings 9 and the grooves 13, and for this purpose they may be provided with finger buttons 22. It will be understood the legs of the strap are resilient. The strap is also provided with means for making a ground connection, such as the screw 23, to which a ground wire in the cable 14 may be connected. The shell 16 fits over the base 15 to cover and protect connections to the cable 14, as shown in Figures 2 and 3, and is retained in place by engagement of the buttons 22 in matching holes 220 in the shell. The shell 16 is releasable from the strap by flexing the legs of the strap toward each other, but this can only be done while the plug-in-device is separated from the bus duct because groove 13 is preferably too shallow to permit such degree of relative movement of the legs of strap 19.

It will be noted that the strap 19 provides means for grounding the shell 16, and the apparatus to which cable 14 is connected. The legs of this strap project above the ends of the contacts 17, so that these legs will make electrical contact with the duct before the contacts 17 can engage the bus bars 5 when plugging in, and maintain such ground connection with the duct after the contacts 17 have disengaged from the bars 5 when unplugging the plug-in-device. Accordingly, all parts connected to the strap 19, including the shell 16, are grounded before making contact, and the ground is maintained after breaking contact.

In order to properly position the bus bars 5 within the duct formed by the sections 1 and 2, the insulating blocks 8 have a central slotted barrier 30 with slots conforming in size and shape substantially to the cross-section of the bus bars, with reasonable allowance for expansion. The central barriers 30 terminate adjacent the upper edges of the bus bars as will be observed from Figure 3, and the slots therein seat the lower edges of the bus bars. Above the upper edges of the bus bars the partitions 31, which separate the several chambers 11, are slotted transversely to accommodate a separate insulation plate 32 of a height such as to extend between the top wall of duct section 1 and the upper edges of the bus bars 5, thereby retaining the latter seated in the slots of barriers 30.

When it is desired to remove the plug-in-device from the duct, the buttons 22 are pressed inward to flex the legs of strap 19 to an extent sufficient to release the lugs 21 from their seated relation against lugs 4, and the plug-in-device thereupon withdrawn. It is noteworthy in this connection that the electrical contact between contact 17 and the bus bars 5 is broken before the grounding contact between strap 19 and the interior of duct section 2 is broken, so that in the process of disconnection the plug-in-device remains grounded until after the electrical circuit to the bus bars is interrupted. Conversely, when the plug-in-device is inserted, it is grounded before the electrical connection with the bus bars is effected.

After the plug-in-device has been removed from the duct, the fuses 18 are exposed for ready replacement, but this cannot be done while the plug-in-device is live.

It will be observed that the assembly of the several parts constituting the bus duct, to wit, the channel sections 1 and 2, the insulator blocks 8, the plate 32 and the bus bars 5, is accomplished without the use of rivets, screws, bolts, or welding, said parts being held in assembled relation by the interlocking feet between the recesses 3 and their component lugs 4. Consequently when it is necessary to gain access to the bus bars, or to any other internal parts of the bus duct, the channel sections 1 and 2 may be quickly and easily released, one from the other, by springing the several recesses 3 apart from their corresponding lugs 4.

From the foregoing discussion, those skilled in the art should readily understand the construction, operation, and advantages of the distribution system, and realize that it accomplishes its objects. While a complete disclosure of one embodiment has been given in the foregoing specification and the accompanying drawings, it is to be understood that the invention is not limited to the details of that disclosure, but is susceptible of variations within the scope of the appended claims.

Having thus described the invention, what is claimed and desired to be secured by Letters Patent is:

1. In a power distribution system of the type having a pair of separable sections forming a duct, and a branch circuit connector having a plug-in cooperation with said duct; the improvement that comprises said duct sections having mutually-engaged snap-in retaining elements which releasably maintain the sections in assembled relationship, and said connector having a snap-in element which interlocks with one of the snap-in elements of the duct to releasably maintain the connector in assembled relationship with said duct, said connector snap-in element being releasable without release of the snap-in elements of the duct sections.

2. In a power distribution system of the type having a pair of separable sections forming a duct, and a branch circuit connector having a plug-in cooperation with said duct; the improvement that comprises said duct sections having telescoping side walls which are formed with complementary detents for retaining the sections in assembled relationship, and said connector having a pair of side members which extend along the side walls of one duct section and which are formed with detents that interlock with the detents in said side walls to retain the connector in assembled relationship with said duct, said connector being releasable without release of said duct sections.

3. Apparatus as set forth in claim 2, wherein the duct section, the side walls of which are next to the sides of the connector, is formed with an outlet for reception of said connector, whereby said other duct section may be removed without disturbing the connector.

4. In a power distribution system of the type having a pair of separable sections forming a duct, and a branch circuit connector having a plug-in cooperation with said duct; the improvement that comprises said duct sections having telescoping side walls which are formed with complementary detents for retaining the sections in assembled relationship, said connector having a pair of resilient projecting legs, the free ends of which have detents that engage with said detents in the side walls to retain the connector in assembled relationship with said duct.

5. In a power distribution system of the type having a pair of separable sections forming a duct, a branch circuit outlet in said duct, and a branch circuit connector having a plug-in cooperation with said outlet; the improvement that comprises said connector having a pair of resilient legs which enter said duct at said outlet, said duct being formed with detents in its side walls, and said resilient legs having detents at their free ends which interlock with said duct detents to retain the connector in assembled relationship with said duct.

6. Apparatus as set forth in claim 5, wherein said resilient legs of the connector are biased outwardly into interlocking engagement with said sides of the duct, said resilient legs having actuating elements which permit inward manipulation of the legs to release the connector from the duct.

7. Apparatus as set forth in claim 6, wherein said duct contains buses exposed at said outlet and further including an insulator extending between said buses and said sides of the duct, said insulator being at least in part spaced from said sides of the duct to permit entrance of said legs but otherwise protecting said buses from engagement by said legs.

8. The apparatus set forth in claim 7, wherein said insulator also supports the bus bars in insulated relationship within the duct.

References Cited in the file of this patent

UNITED STATES PATENTS

| | | |
|---|---|---|
| 1,209,910 | Vetter | Dec. 26, 1916 |
| 1,965,181 | Gerlach et al. | July 3, 1934 |
| 1,967,091 | Kempton | July 17, 1934 |
| 1,970,144 | Kollath | Aug. 14, 1934 |
| 2,039,793 | Harvey | May 5, 1936 |
| 2,117,307 | Frank et al. | May 17, 1938 |
| 2,119,777 | Clayton | June 7, 1938 |
| 2,193,961 | Frank et al. | Mar. 19, 1940 |
| 2,235,020 | Jones | Mar. 18, 1941 |
| 2,251,404 | Frank et al. | Aug. 5, 1941 |
| 2,264,075 | Frank | Nov. 25, 1941 |
| 2,339,600 | Carlson | Jan. 18, 1944 |
| 2,343,216 | Frank et al. | Feb. 29, 1944 |
| 2,444,648 | Jackson et al. | July 6, 1948 |
| 2,456,548 | Weiner et al. | Dec. 14, 1948 |